United States Patent [19]

Steele, Jr.

[11] Patent Number: 5,903,899
[45] Date of Patent: May 11, 1999

[54] SYSTEM AND METHOD FOR ASSISTING EXACT GARBAGE COLLECTION BY SEGREGATING THE CONTENTS OF A STACK INTO SUB STACKS

[75] Inventor: Guy L. Steele, Jr., Lexington, Mass.

[73] Assignee: Sun Microsystems, Inc., Palo Alto, Calif.

[21] Appl. No.: 08/842,063

[22] Filed: Apr. 23, 1997

[51] Int. Cl.⁶ ................................... G06F 17/30
[52] U.S. Cl. .......................... 707/206; 707/200
[58] Field of Search ................... 707/206, 200; 711/200, 115, 5, 201

[56] References Cited

U.S. PATENT DOCUMENTS

| | | | |
|---|---|---|---|
| 4,757,438 | 7/1988 | Thatte et al. | 711/6 |
| 4,907,151 | 3/1990 | Bartlett | 711/166 |
| 4,920,483 | 4/1990 | Pogue et al. | 711/219 |
| 5,222,221 | 6/1993 | Houri et al. | 395/676 |
| 5,301,288 | 4/1994 | Newman et al. | 711/202 |
| 5,355,483 | 10/1994 | Serlet | 711/154 |
| 5,408,650 | 4/1995 | Arsenault | 395/704 |
| 5,535,329 | 7/1996 | Hastings | 395/183.11 |
| 5,560,003 | 9/1996 | Nilsen et al. | 707/206 |
| 5,561,786 | 10/1996 | Morse | 711/170 |
| 5,566,321 | 10/1996 | Pase et al. | 711/153 |
| 5,584,004 | 12/1996 | Aimoto et al. | 711/15 |

*Primary Examiner*—Thomas G. Black
*Assistant Examiner*—Diane D. Mizrahi
*Attorney, Agent, or Firm*—Kudirka & Jobse, LLP

[57] ABSTRACT

In a program data stack in a computer system, every stack is implemented as two substacks, one to contain references and one to contain primitive data. In this manner, whether a piece of information on a stack is a reference or a primitive value is easily determined according to which substack it resides in. Each substack is itself a full-fledged stack data structure with a stack base, a stack pointer, and a stack limit. In the preferred embodiment, there is also a frame pointer for each substack. The normal instruction set is modified so that instructions that operate with references use the reference stack whereas instructions that operate with data use the primitive data stack. Specifically, during compilation, or loading, all instructions which can operate indiscriminately with either references or data are replaced by equivalent, but reference-specific or data-specific instructions. With this arrangement, garbage collection algorithms can locate all references stored within a stack, since the references are all in a more or less contiguous region of memory without interspersed primitive data.

22 Claims, 8 Drawing Sheets

SYSTEM AND METHOD FOR ASSISTING EXACT GARBAGE COLLECTION BY SEGREGATING THE CONTENTS OF A STACK INTO SUB STACKS

CROSS REFERENCES TO RELATED APPLICATIONS

This application is the one of three patent applications filed on an even date herewith and commonly assigned, including pending U.S. patent application Ser. No. 08/838, 971, entitled "APPARATUS AND METHOD FOR ASSISTING EXACT GARBAGE COLLECTION BY USING A STACK CACHE OF TAG BITS", and pending U.S. patent application Ser. No. 08/838,971 entitled "METHOD AND APPARATUS FOR DELTA ENCODING LIVE POINTER MASKS FOR PROGRAM DATA STACKS". The subject matter of the above-identified copending patent applications is hereby incorporated by reference.

FIELD OF THE INVENTION

The present invention relates to data processing systems, and, more specifically, to apparatus and methods for assisting with memory management.

BACKGROUND OF THE INVENTION

One of the most important resources within a data processing system is the amount of memory directly available for utilization by tasks during execution. Accordingly, much interest has been directed to efficient utilization of memory and memory management strategies. An important concept in memory management is the manner in which memory is allocated to a task, deallocated and then reclaimed.

Memory deallocation and reclamation may be explicit and controlled by an executing program, or may be carried out by another special purpose program which locates and reclaims memory which is unused, but has not been explicitly deallocated. "Garbage collection" is the term used in technical literature and the relevant arts to refer to a class of algorithms utilized to carry out storage management, specifically automatic memory reclamation. There are many known garbage collection algorithms, including reference counting, mark-sweep, and generational garbage collection algorithms. These, and other garbage collection techniques, are described in detail in a book entitled "Garbage Collection, Algorithms For Automatic Dynamic Memory Management" by Richard Jones and Raphael Lins, John Wiley & Sons, 1996. Unfortunately, many of the described techniques for garbage collection have specific requirements which cause implementation problems, as described herein.

For the purpose of this specification, the term "object" refers to a data structure that is represented in the memory of a computing system. This usage of the term object is distinct from the usage of the term "object" in "object-oriented" systems, wherein objects have associated "methods", i.e. pieces of code associated with them, which code may be invoked through a reference to the object. However, the present invention is applicable to such object-oriented systems.

An object may be located by a "reference", or a small amount of information that can be used to access the data structure. One way to implement a reference is by means of a "pointer" or "machine address", which uses multiple bits of information, however, other implementations are possible. General-purpose programming languages and other programmed systems often use references to locate and access objects. Such objects can themselves contain references to data, such as integers or floating-point numbers and to yet other objects. In this manner, a chain of references can be created, each reference pointing to an object which, in turn, points to another object.

Garbage collection techniques determine when a data structure is no longer reachable by an executing program, either directly or through a chain of pointers. When a data structure is no longer reachable, the memory that the data structure occupies can be reclaimed and reused even if it has not been explicitly deallocated by the program. To be effective, garbage collection techniques should be able to, first, identify references that are directly accessible to the executing program, and, second, given a reference to an object, identify references contained within that object, thereby allowing the garbage collector to trace transitively chains of references.

A subclass of garbage collectors known as "relocating" garbage collectors, relocate data structures that are still reachable by the executing program. Relocation of a data structure is accomplished by making a copy of the data structure in another region of memory, then replacing all reachable references to the original data structure with references to the new copy. The memory occupied by the original data structure may then be reclaimed and reused. Relocating garbage collectors have the desirable property that they compact the memory used by the executing program and thereby reduce memory fragmentation.

Because relocating garbage collectors modify references during the garbage collection process, it is important that references be identified and distinguished from non-reference information, such as data, which cannot be modified for garbage collection purposes. Consequently, fully relocating garbage collectors belong to a subclass of garbage collection methods, known as "exact" garbage collectors, which require knowledge whether a given piece of information in memory is a reference or a primitive value. For the purposes of this document, a "primitive value" or "primitive data" is defined as data which does not function as a reference, such as an integer or floating point number.

In order to facilitate the use of exact garbage collection, some computing systems use a "tagged" representation for all memory locations to positively distinguish references from data. In such systems, references and primitive data, such as integers and floating-point numbers, are represented in memory in a manner that a reference always has a different bit pattern than a primitive value. This is generally done by including tag bits in each memory location in addition to the bits holding the memory location value. The tag bits for a memory location holding a reference value are always different from the tag bits for a memory location holding a datum value. The MIT LISP Machine was one of the first architectures which used garbage collection and had a single stack with explicitly tagged memory values. Its successor, the Symbolics 3600, commercially available from Symbolics, Inc., Cambridge, Mass., also used explicitly tagged memory values. The Symbolics 3600 was able to accommodate either a 32-bit reference or a 32-bit primitive datum in a single stack by using 36 bit words, 4 bits of which were permanently allocated for tagging information. As such, the bit pattern within a 36-bit word for a reference was always distinguishable from the bit pattern for a primitive integer or floating-point value.

Permanently allocated tag bits have the disadvantage that they consume memory space that might otherwise be used to store computational data. Consequently, many computer systems use an "untagged" data representation in which the entire memory word is devoted to representing the datum value. In such systems, the same bit pattern might represent a reference or a primitive value. As a result, in such systems, the distinction between references and primitive values is often made from external considerations or representations, such as the instruction that is to operate on the data, or the position of the data within an object. However, the use of external considerations to make this distinction was not possible in all systems.

For example, the Java programming language was originally designed for use in systems using untagged data representation. The Java programming language is described in detail in the text entitled "The Java Language Specification" by James Gosling, Bill Joy and Guy Steele, Addison-Wesley, 1996. The Java language was designed to run on computing systems with characteristics that are specified by the Java Virtual Machine Specification which is described in detail in a text entitled "The Java Virtual Machine Specification", by Tim Lindholm and Frank Yellin, Addison-Wesley, 1996.

According to the Java Virtual Machine (JVM) Specification, a local variable or stack slot in a computing system using 32-bit memory words may contain either a 32-bit integer, a 32-bit floating-point number, or a 32-bit reference. Consequently, tagged data representation cannot be used in all cases (programming languages that use tagged data representation on 32-bit computer architectures typically restrict the size of integers to 30 bits.) However, it is not possible to distinguish references from data in all cases by examining Java instructions, because many instructions operate indiscriminately on references and data.

Another technique by which references and primitive data are identified and distinguished is to keep them on separate stacks. This technique was used in a system that also used garbage collection and goes back more than twenty years, to a version of the MacLisp system that had four stacks. Two of these stacks contained references and two did not. Of the two that contained references, one contained ordinary subroutine arguments and one contained "dynamic bindings" of so-called "special variables". Of the two that contained primitive data, one held integer values and one held floating-point values. While it was true that the garbage collector did not need to scan the integer and floating-point stacks while looking for references, the principal motivation for this separation was not to use two or more stacks to simulate a single logical stack, but rather to stack-allocate certain numerical quantities that might otherwise have required allocation in the garbage-collected heap, and to be able to tell whether such data was integer or floating-point by its address. This required two separate stacks for primitive data, not just one. Subroutine arguments were never passed on the two primitive stacks. Rather, every argument was represented as a reference on the main reference stack. Although some of these references were addresses of locations on the numerical stacks, this was a consequence of the more general mechanism for stack allocation of numerical values. Local variables of the reference type were allocated on the reference stack and local variables of numerical type might, or might not, be allocated on a numerical stack. If a local variable of the numerical type was allocated on a numerical stack, it might be represented in a dual form where the numerical value was stored in a numerical stack and the address of the location on the numerical stack was stored in the reference stack. A generalization of such a strategy was used in the S-1 LISP language.

Accordingly, implementation of an exact garbage collection algorithm with a computer system architecture which does not accommodate tagged data or which does not support segregation of operands into different stacks presents implementation problems.

SUMMARY OF THE INVENTION

A central feature of this invention is to implement every stack as two substacks, one to contain references and one to contain primitive data. In this manner, whether a piece of information on a stack is a reference or a primitive value is easily determined according to which substack it resides in. Each substack is itself a full-fledged stack data structure with a stack base, a stack pointer, and a stack limit. In the preferred embodiment, there is also a frame pointer for each substack. The normal instruction set is modified so that all instructions that operate with references use the reference stack whereas all instructions that operate with data use the primitive data stack. In accordance with one embodiment, during compilation, or loading, all instructions which can operate indiscriminately with either references or data are replaced by equivalent, but reference-specific or data-specific instructions.

The invention enables garbage collection algorithms to locate all references stored within a stack, since the references are all in a more or less contiguous region of memory without interspersed primitive data. According to one aspect of the invention, the two substacks representing a single stack occupy the same linear, contiguous region of memory that otherwise would have been dedicated to the single stack.

BRIEF DESCRIPTION OF THE DRAWINGS

The above and further advantages of the invention may be better understood by referring to the following description in conjunction with the accompanying drawings and which.

DESCRIPTION OF THE PREFERRED EMBODIMENT

The present invention provides a method and apparatus which addresses the requirements of exact garbage collection algorithms. Specifically, the invention addresses the requirement of distinguishing references from non-references within a data stack where data representations are untagged and references and primitive values have the same size representations.

Although the illustrative embodiments are described with reference to a computer system implementing the Java programming language and Java Virtual Machine specifications, the invention is equally applicable to other computer systems having similar requirements. Specifically, the invention may be implemented with both object oriented and non-object oriented programming systems, as well as multi threaded operating systems, having multiple stacks, as well as operating systems having single threads or single stacks. Prior to describing the invention in detail, a description of a computer system suitable for implementing the present invention, and a conventional stack architecture is provided for the reader's benefit.

Computer System and Stack Architecture

Figure 1A:
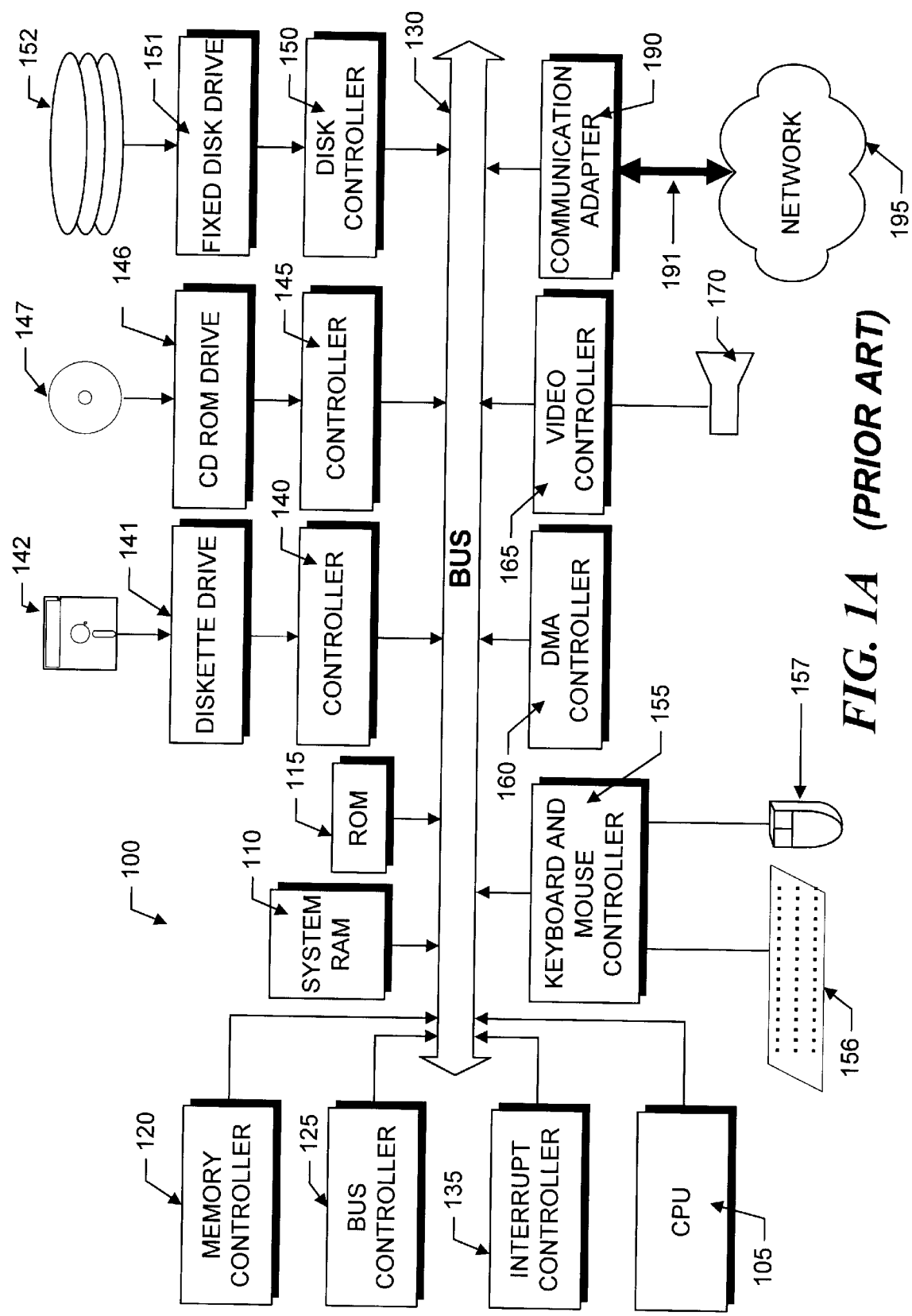
FIG. 1A is a schematic block diagram illustrating a computer system suitable for use with the present invention.

FIG. 1A illustrates the system architecture for a computer system 100 with which the invention may be implemented. The exemplary computer system of FIG. 1 is for descriptive purposes only. Although the description may refer to terms commonly used in describing particular computer systems, such as in IBM PS/2 computer, the description and concepts equally apply to other computer systems such as network computers, workstations and even mainframe computers, having architectures dissimilar to FIG. 1A.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RMA 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Boca Raton, Fla. The operating system controls allocation of system resources and performs tasks such as processing scheduling, memory management, networking, and I/O services, among things.

Figures 1B, 1C:
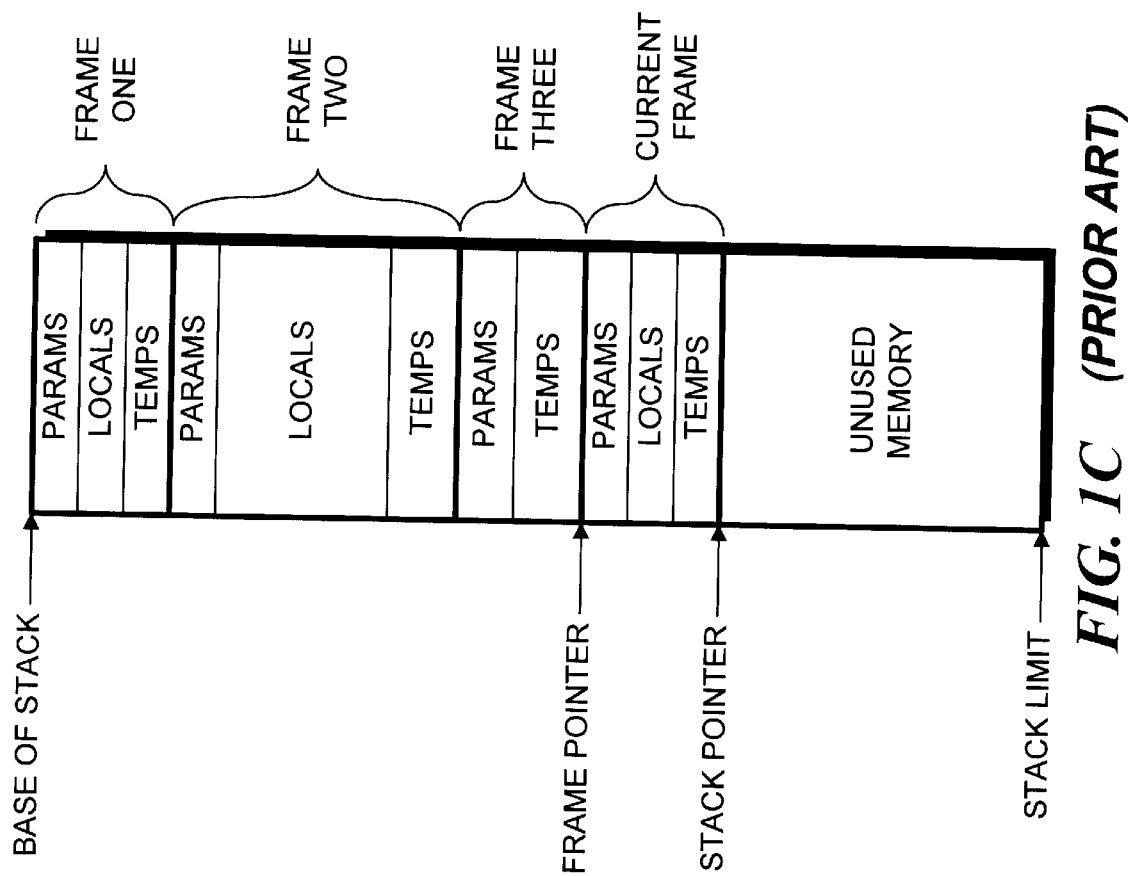
FIG. 1B is a conceptual illustration of a conventional program data stack.
FIG. 1C is a conceptual diagram of a conventional program stack, including frames.

In conventional computing systems, an ongoing computation uses a "stack" to support procedure calls and to hold intermediate computational quantities such as references, and primitive values. A stack comprises an unused portion of internal memory which reduces the number of registers needed for temporary storage and decreases the number of steps needed in a program, while facilitating push-down type storage. FIG. 1B illustrates conceptually the structure of a conventional program stack residing in system memory. Three important positions in memory define the stack: the stack base, the stack pointer, i.e., the current stack top, and the stack limit. Typically, these positions are identified by memory addresses kept in three machine registers.

When a datum is to be pushed onto the stack, it is stored into the unused memory location nearest the stack pointer. The stack pointer is then advanced toward the stack limit. If the stack pointer is too close to the stack limit, the stack is said to "overflow" and some special action must be taken, e.g. signal an error or allocate more memory to hold the stack.

When a datum is to be popped from the stack, the stack pointer recedes toward the stack base, causing the memory that holds the datum to become regarded as unused memory again. If the stack pointer is too close to the stack base, the stack is said to "underflow" and some special action must be taken, e.g. signal an error or switch to another region of memory that holds more stack data. Depending on the implementation, the stack base may reside at either a higher or lower memory address then the stack limit.

In the Java programming language, data on the stack is grouped into "frames", as illustrated in FIG. 1C. Each frame corresponds to one level of subroutine invocation or method invocation. Every frame is divided into three regions: parameters, local variables, and evaluation temporaries. Parameters are closest to the stack base while the evaluation temporaries are furthest from the stack base. Each of these three regions may be empty, depending on the particular subroutine to be executed with that frame. As a subroutine executes, the number of evaluation temporaries may vary as items are pushed onto or popped from the stack, however, the number of parameters and local variables typically does not vary. Consequently, different frames may have different sizes.

To simplify addressing of parameters and local variables, an additional address, the "frame pointer", typically kept in a machine register, indicates start of the parameter area in the current stack frame. Instructions can then access a parameter or local variable in the current frame by specifying an offset from the current frame pointer.

When a subroutine or method is to be invoked, some items at the top of the evaluation stack become parameters within the new frame. The current frame pointer is saved on the stack along with the program counter. The frame pointer is then loaded with the address of the new frame while the program counter is loaded with the address of the code for the subroutine.

Some computing systems are "multi-threaded" in which multiple ongoing computational processes share a single address space or a single pool of objects. Such a set of processes typically has more than one stack or one stack for each process. Such multiple processes can be served by a single storage management strategy.

Segregated Stack Architecture

A central feature of this invention is to implement every stack as two substacks, one to contain references and one to contain primitive data. In this manner, whether a piece of information on a stack is a reference or a primitive value is easily determined according to which substack it resides in. Each substack is itself a full-fledged stack data structure with a stack base, a stack pointer, and a stack limit. In the preferred embodiment, there is also a frame pointer for each substack.

Figure 2:
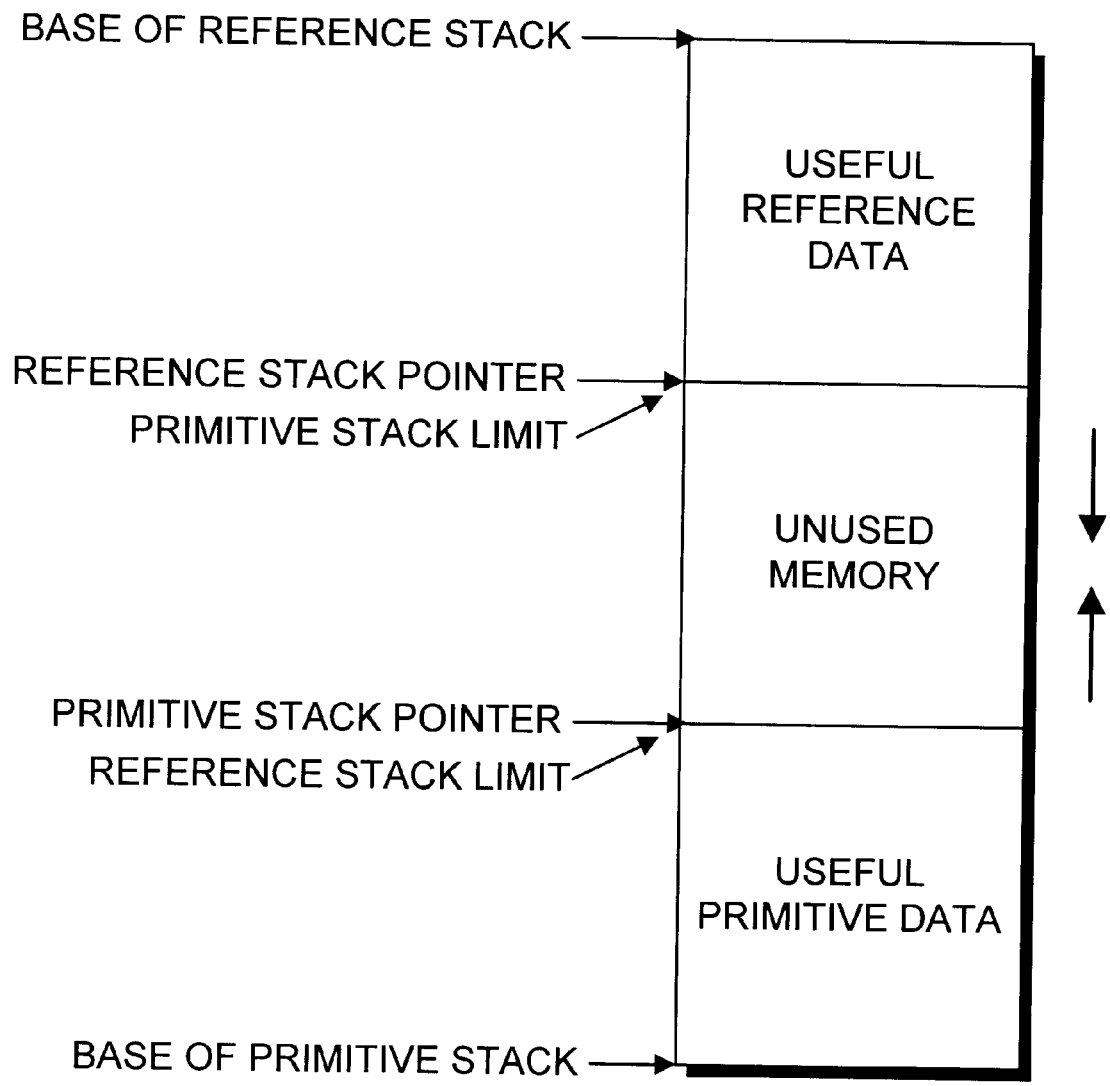
FIG. 2 is a conceptual diagram of a simple program stack segregated into substacks in accordance with a first embodiment of the present invention.

With the inventive technique described herein, a garbage collection algorithm can easily locate all references stored within a stack, since all references are in a more or less contiguous region of memory without interspersed primitive data. In the preferred embodiment as conceptually illustrated in FIG. 2, the two substacks representing a single stack occupy the same linear, contiguous region of memory that otherwise would have been dedicated to the single stack. The reference stack grows "downward" while the primitive stack grows "upward" so that the two stacks grow toward each other. One end of the linear contiguous memory region is indicated by the "reference stack base" and the other end by the "primitive stack base". In the preferred embodiment, there are two stack pointers. For the purposes of the stack push and pop operations, the reference stack pointer serves as the primitive stack limit, and the primitive stack pointer serves as the reference stack limit. In this manner, memory is not further fragmented since there is only one region of "unused memory", not two.

Figure 3:
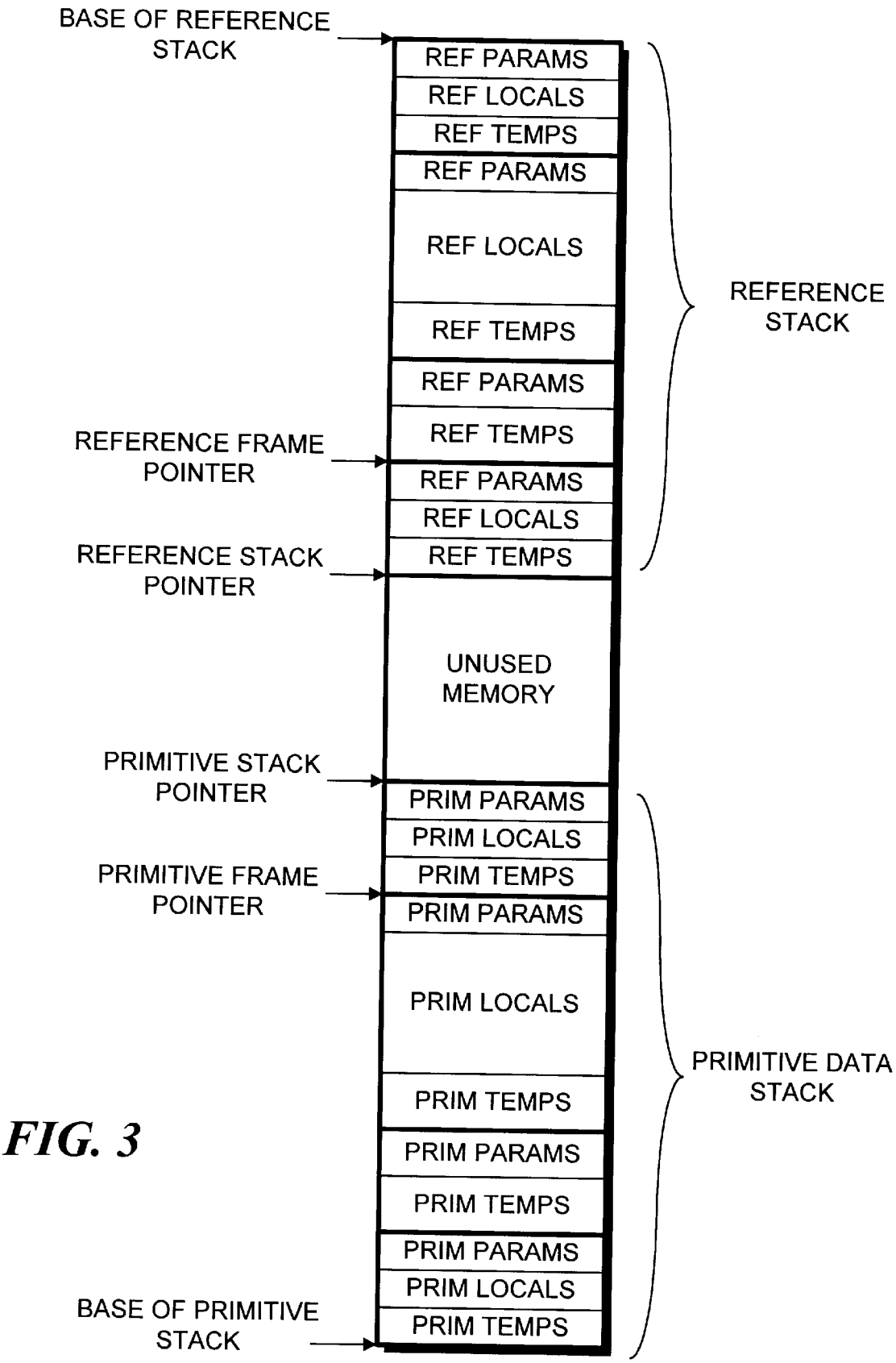
FIG. 3 is a conceptual diagram of a program stack, including frames, segregated into substacks in accordance with a second embodiment of the present invention.
Figure 4A:
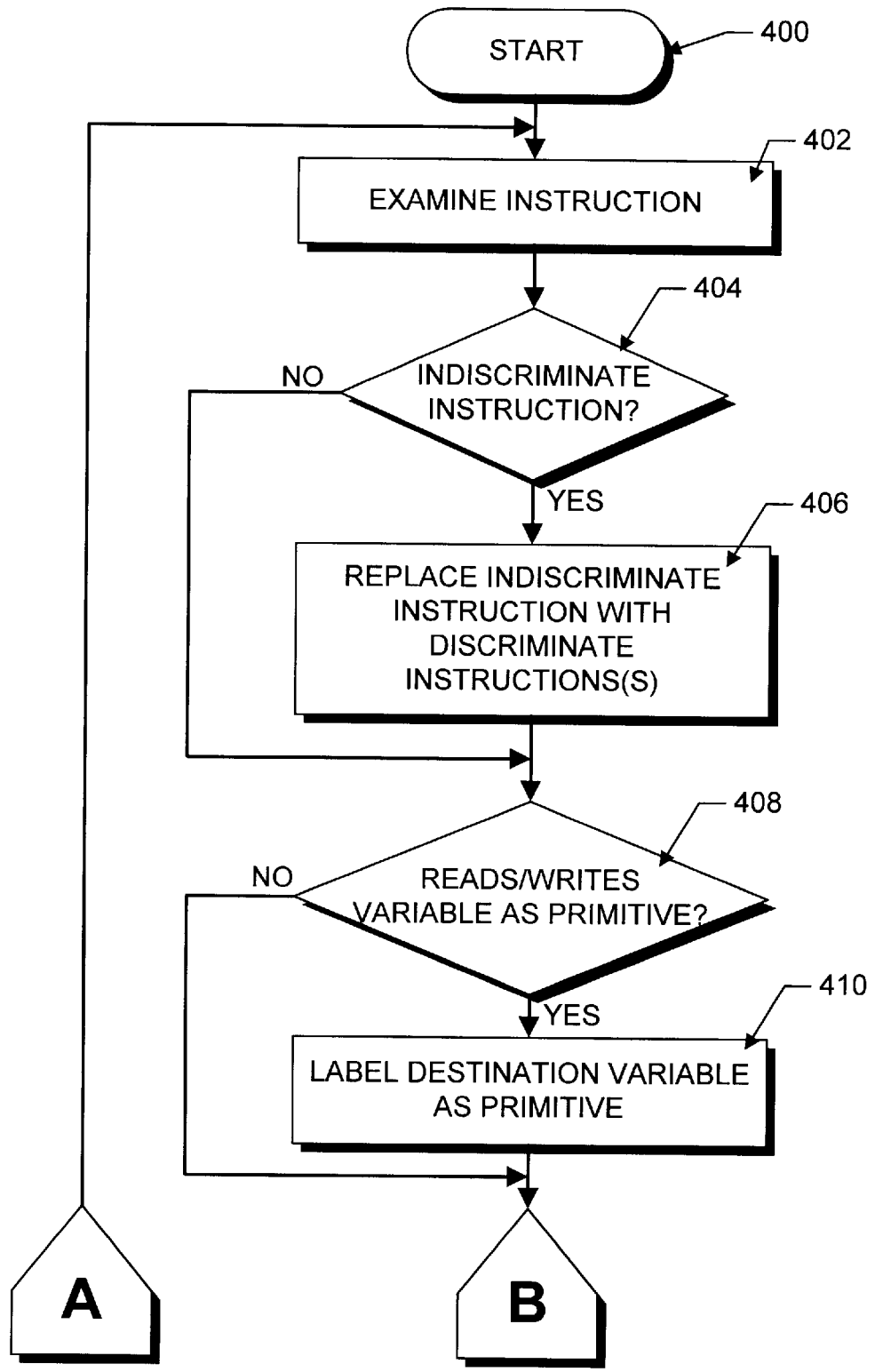
FIGS. 4A–4D, when placed together, form a flowchart illustrating the operation of the inventive stack allocation method.
Figure 4B:
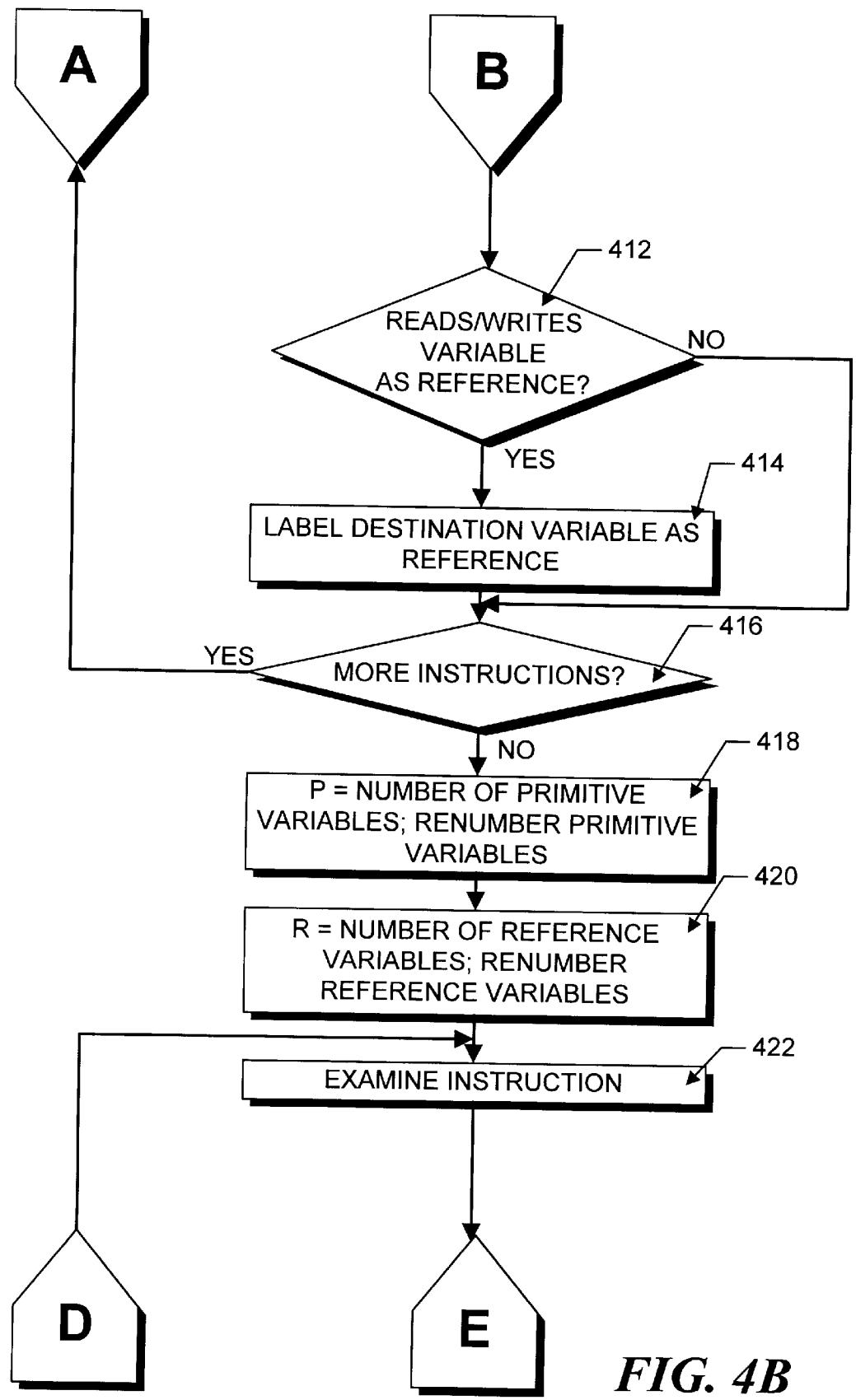
Figure 4C:
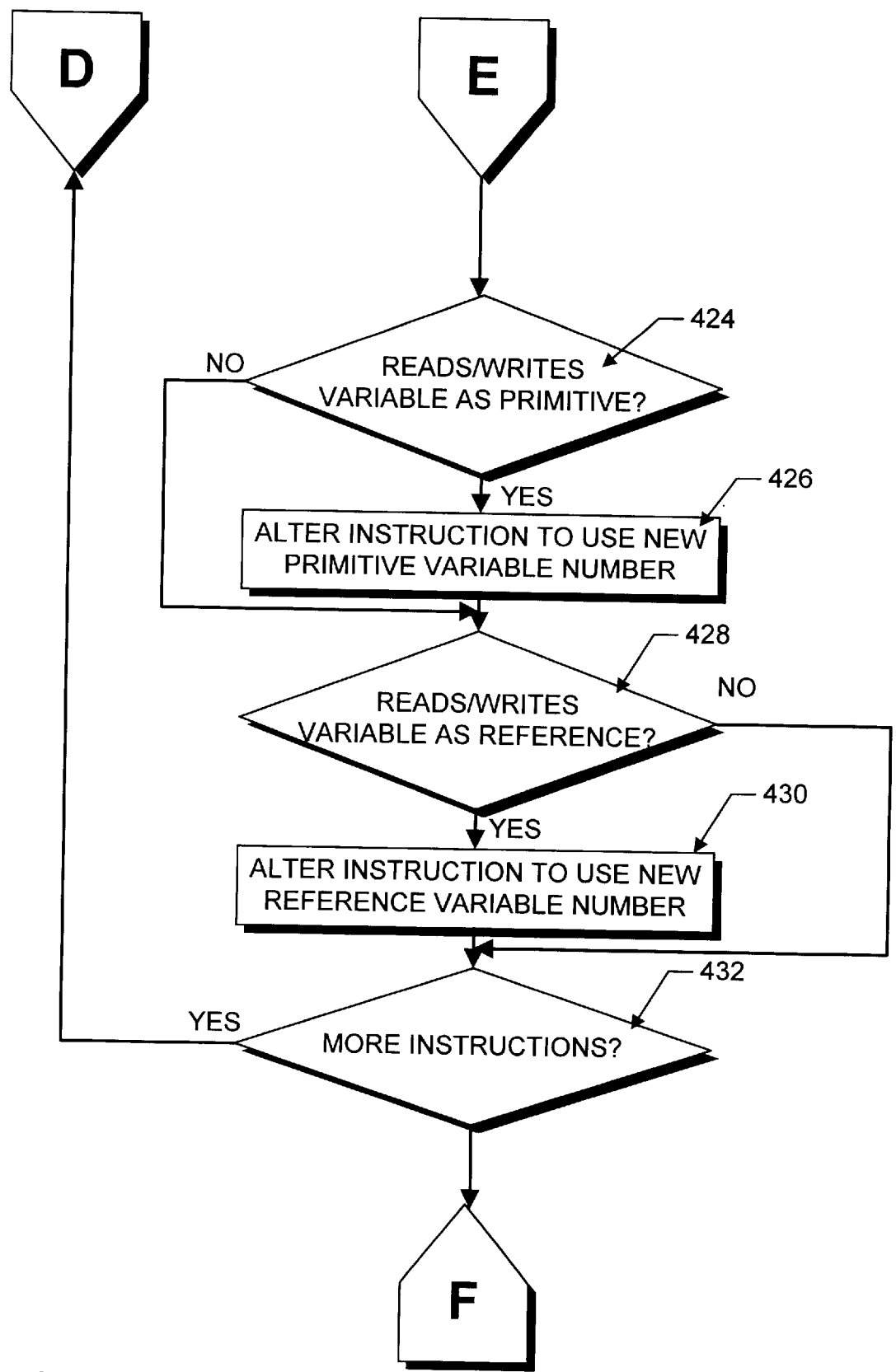
Figure 4D:
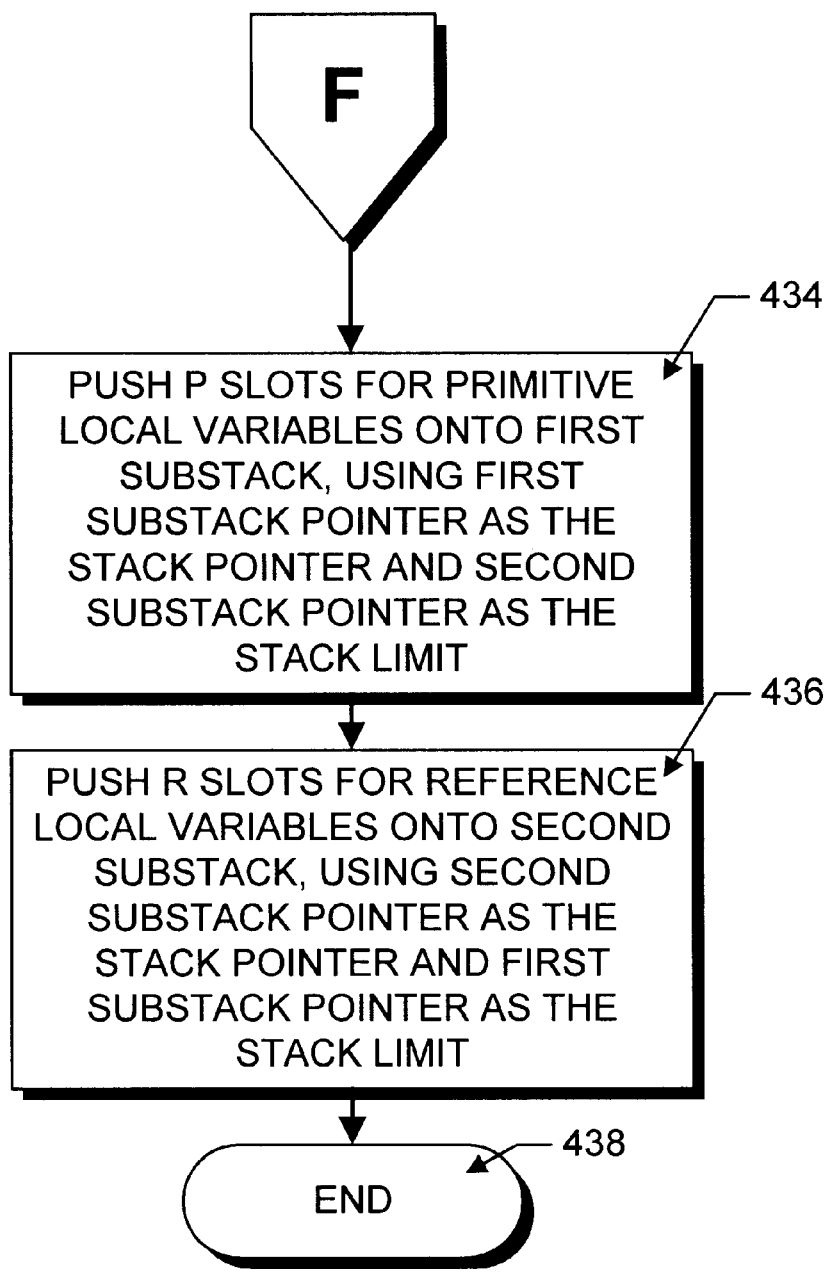

FIG. 3 illustrates a program data stack having contents segregated into a pair of substacks in accordance with a first embodiment of the present invention. As with the conventional stack data on the stack is grouped into "frames", as illustrated in FIG. 3. Each frame corresponds to one level of subroutine invocation or method invocation. Every frame is divided into three regions: parameters, local variables, and evaluation temporaries. Parameters are closest to the stack base while the evaluation temporaries are furthest from the stack base. There are two sets of frames, one corresponding to the reference stack and one corresponding to the primitive stack. As the reference stack grows, the reference stack pointer moves downward and, as the primitive stack grows the primitive stack pointer moves upward. The unused memory space is located between the two stacks.

With the segregated stack of the present invention, every operation on a stack that is to be performed by the ongoing computation must use the appropriate substack depending on whether the data to be used or transferred is reference data or primitive data. For example, the "iadd" instruction pops two operands from the stack, which are integers i.e. not references. Their sum is then pushed back onto the stack as an integer. Using the inventive two-stack technique, the "iadd" instruction is redefined to pop two operands from the PRIMITIVE stack. Their sum is then pushed back onto the PRIMITIVE stack as an integer.

Similarly, the "aaload" instruction pops two items from the stack, which must be a reference to an array of references and an integer index. The instruction selects a reference from the array as indicated by the index value and then pushes a copy of the selected reference onto the stack. Using the inventive two-stack technique, the "aaload" instruction is redefined to pop one item from the REFERENCE stack, which must be a reference to an array of references, and to pop one item from the PRIMITIVE stack, an integer index. The instruction selects a reference from the array as indicated by the index value, and then pushes a copy of the selected reference onto the REFERENCE stack.

Most of the other Java Virtual Machine bytecode instructions may be similarly redefined so as to use the appropriate substack for each operand or result according to whether it is a reference value or a primitive value. A description of the redefinition of such other bytecode instructions according to the Java virtual machine specification will be within the scope of those skilled in the art in light of the description above and will not be provided herein.

The following Java Virtual Machine bytecode instructions may be additionally redefined to use one of two frame pointers:

| lload  | lload_0  | lload_1  | lload_2  | lload_3  |
| fload  | fload_0  | fload_1  | fload_2  | fload_3  |
| lload  | lload_0  | lload_1  | lload_2  | lload_3  |
| dload  | dload_0  | dload_1  | dload_2  | dload_3  |
| aload  | aload_0  | aload_1  | aload_2  | aload_3  |
| istore | istore_0 | istore_1 | istore_2 | istore_3 |
| fstore | fstore_0 | fstore_1 | fstore_2 | fstore_3 |
| lstore | lstore_0 | lstore_1 | lstore_2 | lstore_3 |
| dstore | dstore_0 | dstore_1 | dstore_2 | dstore_3 |
| astore | dstore_0 | dstore_1 | dstore_2 | astore_3 |

Those whose name begin with "a" deal with reference values and therefore use the reference frame pointer. The others deal with primitive values and therefore use the primitive frame pointer.

It is not possible, in this framework, to use instructions that are indiscriminate as to whether a stack operand is a reference or primitive data. Therefore, additional instructions and two mechanisms are required, which are first summarized here and then elaborated upon below.

For every instruction, whether an ordinary JVM instruction or implementation-dependent "quick" instruction, if that instruction is indiscriminate, then the instruction is replaced by new instructions which are added to the instruction set. In this manner, all instructions in the instruction set perform the relevant discriminations.

The verifier is altered so that, as it traverses the code of a method (before the code for that method has ever been executed), whenever it examines any particular instance of a nominally indiscriminate instruction and determines which of its operands and results will be references, it replaces that instruction at verification time with one of several instructions that are logically equivalent but distinguish, for each stack operand or result, whether or not that operand or result is a reference. (In an alternate embodiment of the invention, a compiler might generate the necessary specialized instructions directly.)

The mechanism that replaces slower instructions with quick instructions after symbolic name resolution is also modified so it chooses one of several possible quick instructions as the replacement. The choice of replacement instructions is made in such a manner to avoid losing information which would identify a particular stack operand or result as a reference.

Modified Instruction Set

The standard JVM instructions pop, pop2, dup, dup2, dup_x1, dup_x2, dup2_x1, dup2_x2, swap are construed always to operate on primitive values, using the primitive stack. For reasons of naming symmetry, explained below, each is given one or more additional names. Their instruction descriptions are therefore revised as follows. In every instruction description:

Let v1 mean the topmost item on the primitive stack.

Let v2 mean the second item from the top on the primitive stack.

Let v3 mean the third item from the top on the primitive stack.

Let v4 mean the fourth item from the top on the primitive stack.

pop = vpop
    Pop v1 from the primitive stack (and discard).
pop2 = vvpop

```
        Pop v1 from the primitive stack (and discard), then
        pop v2 from the primitive stack (and discard).
    dup = vdup = a_vdup = aa_vdup
        Push a copy of v1 onto the primitive stack.
    dup2 = vvdup = a_vvdup = va_vdup
        Pop v1 from the primitive stack, then
        pop v2 from the primitive stack, then
        push a copy of v1 onto the primitive stack, then
        push a copy of v2 onto the primitive stack, then
        push another copy of v1 onto the primitive stack.
    dup_x2 = vv_vdup
        Pop v1 from the primitive stack, then
        pop v2 from the primitive stack, then
        pop v3 from the primitive stack, then
        push a copy of v1 onto the primitive stack, then
        push a copy of v3 onto the primitive stack, then
        push a copy of v2 onto the primitive stack, then
        push another copy of v1 onto the primitive stack.
    dup2_x1 = v_vvdup = av_vvdup = va_vvdup
        Pop v1 from the primitive stack, then
        pop v2 from the primitive stack, then
        pop v3 from the primitive stack, then
        push a copy of v2 onto the primitive stack, then
        push a copy of v1 onto the primitive stack, then
        push a copy of v3 onto the primitive stack, then
        push another copy of v2 onto the primitive stack, then
        push another copy of v1 onto the primitive stack.
    dup2_x2 = vv_vvdup
        Pop v1 from the primitive stack, then
        pop v2 from the primitive stack, then
        pop v3 from the primitive stack, then
        pop v4 from the primitive stack, then
        push a copy of v2 onto the primitive stack, then
        push a copy of v1 onto the primitive stack, then
        push a copy of v4 onto the primitive stack, then
        push a copy of v3 onto the primitive stack, then
        push another copy of v2 onto the primitive stack, then
        push another copy of v1 onto the primitive stack.
    swap = vvswap
        Pop v1 from the primitive stack, then
        pop v2 from the primitive stack, then
        push a copy of v1 onto the primitive stack, then
        push a copy of v2 onto the primitive stack.
```

Also, the instruction "nop" is given two additional names:

```
    nop = avswap = vaswap
        Take no action.
```

Certain of these instructions have more than one name, again for naming symmetry. To fully utilize the advantageous design of the segregated stack in accordance with the present invention, a number of new instructions are proposed as part of the invention.

The behavior of the new additional instructions is as follows. In every instruction description:

Let a1 mean the item that is topmost on the reference stack when the instruction begins execution.

Let a2 mean the item that is second from the top on the reference stack when the instruction begins execution.

Let a3 mean the item that is third from the top on the reference stack when the instruction begins execution.

Let a4 mean the item that is fourth from the top on the reference stack when the instruction begins execution.

Let v1 mean the item that is topmost on the primitive stack when the instruction begins execution.

Let v2 mean the item is second from the top on the primitive stack when the instruction begins execution.

Let v3 mean the item that is third from the top on the primitive stack when the instruction begins execution.

```
apop
    Pop a1 from the reference stack (and discard).
aapop
    Pop a1 from the reference stack (and discard) and
    pop v1 from the primitive stack (and discard).
avpop = vapop
    Pop a1 from the reference stack (and discard) and
    pop v1 from the primitive stack (and discard).
adup = v_adup = vv_adup
    Push a copy of a1 onto the reference stack.
aadup = v_aadup = vv_aadup
    Push a copy of a2 onto the reference stack, then
    push a copy of a1 onto the reference stack.
avdup = vadup
    Push a copy of a1 onto the reference stack, and
    push a copy of v1 onto the primitive stack.
a_adup = av_adup = va_adup
    Pop a1 from the reference stack, then
    pop a2 from the reference stack, then
    push a copy of a1 onto the reference stack, then
    push a copy of a2 onto the reference stack, then
    push another copy of a1 onto the reference stack.
a_aadup = av_aadup = va_aadup
    Pop a1 from the reference stack, then
    pop a2 from the reference stack, then
    pop a3 from the reference stack, then
    push a copy of a2 onto the reference stack, then
    push a copy of a1 onto the reference stack, then
    push a copy of a3 onto the reference stack, then
    push another copy of a2 onto the reference stack, then
    push another copy of a1 onto the reference stack.
a_avdup = a_vadup
    Pop a1 from the reference stack, then
    pop a2 from the reference stack, then
    push a copy of a1 onto the reference stack, then
    push a copy of a2 onto the reference stack, then
    push another copy of a1 onto the reference stack; and
    push a copy of v1 onto the primitive stack.
v_avdup = v_vadup
    Pop v1 from the primitive stack, then
    pop v2 from the primitive stack, then
    push a copy of v1 onto the primitive stack, then
    push a copy of v2 onto the primitive stack, then
    push another copy of v1 onto the primitive stack; and
    push a copy of a1 onto the reference stack.
aa_adup
    Pop a1 from the reference stack, then
    pop a2 from the reference stack, then
    pop a3 from the reference stack, then
    push a copy of a1 onto the reference stack, then
    push a copy of a3 onto the reference stack, then
    push a copy of a2 onto the reference stack, then
    push another copy of a1 onto the reference stack.
aa_aadup
    Pop a1 from the reference stack, then
    pop a2 from the reference stack, then
    pop a3 from the reference stack, then
    pop a4 from the reference stack, then
    push a copy of a2 onto the reference stack, then
    push a copy of a1 onto the reference stack, then
    push a copy of a4 onto the reference stack, then
    push a copy of a3 onto the reference stack, then
    push another copy of a2 onto the reference stack, then
    push another copy of a1 onto the reference stack.
aa_avdup = aa_vadup
    Pop a1 from the reference stack, then
    pop a2 from the reference stack, then
    pop a3 from the reference stack, then
    push a copy of a1 onto the reference stack, then
    push a copy of a3 onto the reference stack, then
    push a copy of a2 onto the reference stack, then
    push another copy of a1 onto the reference stack; and
    push a copy of v1 onto the primitive stack.
vv_avdup = vv_vadup
    Pop v1 from the primitive stack, then
    pop v2 from the primitive stack, then
    pop v3 from the primitive stack, then
    push a copy of v1 onto the primitive stack, then
    push a copy of v3 onto the primitive stack, then
    push a copy of v2 onto the primitive stack, then
```

-continued

```
        push another copy of v1 onto the primitive stack; and
        push a copy of a1 onto the reference stack.
    av_avdup = va_avdup = av_vadup = va_vadup
        Pop a1 from the reference stack, then
        pop a2 from the reference stack, then
        push a copy of a1 onto the reference stack, then
        push a copy of a2 onto the reference stack, then
        push another copy of a1 onto the reference stack; and
        pop v1 from the primitive stack, then
        pop v2 from the primitive stack, then
        push a copy of v1 onto the primitive stack, then
        push a copy of v2 onto the primitive stack, then
        push another copy of v1 onto the primitive stack.
    aaswap
        Pop a1 from the reference stack, then
        pop a2 from the reference stack, then
        push a copy of a1 onto the reference stack, then
        push a copy of a2 onto the reference stack.
```

In the preferred embodiment whenever the verifier examines an instance of any of the pop, pop2, dup, dup2, dup_x1, dup_x2, dup2_x1, dup2_x2, or swap instructions the verifier will have determined for each item on the stack whether that item will always be a reference or always be a primitive value when that instruction is executed. The verifier then forms the name of a replacement instruction as follows:

(a) For pop or pop2, use the base name "pop".
   For dup, dup2, dup_x1, dup_x2, dup2_x1, or dup_x2, use the base name "dup".
   For swap, use the base name "swap".

(b) For pop or dup, prefix one letter to the base name, representing the topmost stack item.
   For pop2, dup_x1, dup2, or swap, prefix two letters to the base name, representing the two topmost stack items, with the second letter of the resulting name representing the topmost stack item and the first letter of the resulting name representing the next stack item.
   For dup_x2 or dup2_x1, prefix three letters to the base name, representing the three topmost stack items, with the third letter of the resulting name representing the topmost stack item, the second letter of the resulting name representing the next stack item, and the first letter of the resulting name representing the item below that.
   For dup2_x2, prefix four letters to the base name representing the four topmost stack items, with the fourth letter of the resulting name representing the topmost stack item, the third letter of the resulting name representing the next stack item, the second letter of the resulting name representing the next stack item, and the first letter of the resulting name representing the item below that.

(c) For pop, pop2, dup, dup2, or swap, no further action is necessary.
   For dup_x1 or dup2_x1, insert the character "_" between the first and second letters of the name resulting from step (b).
   For dup_x2 or dup2_x2, insert the character "_" between the second and third letters of the name resulting from step (b).

The instruction so named is then used to replace the original instruction. Note that the replacement instruction may be the same as the original instruction, under another name. The names of these instructions are chosen so that the letters "a" and "v" in the prefix form a picture of the stack to be operated upon, considering the stack in its logical, single-stack form. The letter for the topmost stack item is nearest the base name of the operation ("pop", "dup", or "swap"). If "_" is present in the name, it separates items acted upon by the instruction from items that are skipped over. The items acted upon are adjacent to the operation name "pop", "dup", or "swap".

Instruction Mapping Mechanisms

Alternatively, rather than the verifier performing the process steps of constructing the instruction names as described above, replacement of names can be performed through the use of a decision table or other mechanisms for mapping an instruction name and a set of binary values to a new instruction name. A decision table in accordance with the illustrative embodiment of the invention which is capable of performing the mapping of instruction names to a new instruction is illustrated in Table 1. Utilization of a decision table as illustrated in Table 1 eliminates the need for redundant names for instructions. In Table 1, an "X" signifies a "don't care condition.

TABLE 1

| original instruction | fourth item | third item | next to top | top of stack | replacement instruction |
| --- | --- | --- | --- | --- | --- |
| pop | x | x | x | a | apop |
| pop | x | x | x | v | pop |
| pop2 | x | x | a | a | aapop |
| pop2 | x | x | v | a | avpop |
| pop2 | x | x | a | v | avpop |
| pop2 | x | x | v | v | pop2 |
| dup | x | x | x | a | adup |
| dup | x | x | x | v | dup |
| dup2 | x | x | a | a | aadup |
| dup2 | x | x | v | a | avdup |
| dup2 | x | x | a | v | avdup |
| dup2 | x | x | v | v | dup2 |
| dup_x1 | x | x | a | a | a_adup |
| dup_x1 | x | x | v | a | adup |
| dup_x1 | x | x | a | v | dup |
| dup_x1 | x | x | v | v | dup_x1 |
| dup_x2 | x | a | a | a | aa_adup |
| dup_x2 | x | v | a | a | a_adup |
| dup_x2 | x | a | v | a | a_adup |
| dup_x2 | x | v | v | a | adup |
| dup_x2 | x | a | a | v | dup |
| dup_x2 | x | v | a | v | dup_x1 |
| dup_x2 | x | a | v | v | dup_x1 |
| dup_x2 | x | v | v | v | dup_x2 |
| dup2_x1 | x | a | a | a | a_adup |
| dup2_x1 | x | v | a | a | aadup |
| dup2_x1 | x | a | v | a | a_avdup |
| dup2_x1 | x | v | v | a | v_avdup |
| dup2_x1 | x | a | a | v | a_avdup |
| dup2_x1 | x | v | a | v | v_avdup |
| dup2_x1 | x | a | v | v | dup2 |
| dup2_x1 | x | v | v | v | dup2_x1 |
| dup2_x2 | a | a | a | a | aa_aadup |
| dup2_x2 | v | a | a | a | a_aadup |
| dup2_x2 | a | v | a | a | a_aadup |
| dup2_x2 | v | v | a | a | aadup |
| dup2_x2 | a | a | v | a | aa_avdup |
| dup2_x2 | v | a | v | a | av_avdup |
| dup2_x2 | a | v | v | a | av_avdup |
| dup2_x2 | v | v | v | a | vv_avdup |
| dup2_x2 | a | a | a | v | aa_avdup |
| dup2_x2 | v | a | a | v | av_avdup |
| dup2_x2 | a | v | a | v | av_avdup |
| dup2_x2 | v | v | a | v | vv_avdup |
| dup2_x2 | a | a | v | v | dup2 |
| dup2_x2 | v | a | v | v | dup2_x1 |
| dup2_x2 | a | v | v | v | dup2_x1 |
| dup2_x2 | v | v | v | v | dup2_x2 |
| swap | x | x | a | a | aaswap |
| swap | x | x | v | a | nop |
| swap | x | x | a | v | nop |
| swap | x | x | v | v | swap |

In the preferred embodiment of this invention, Java byte-code instruction set opcodes may be assigned to the new instructions as follows:

| | | |
|---|---|---|
| 237 | apop | |
| 238 | aapop | |
| 239 | avpop | |
| 240 | aaswap | |
| 241 | adup | |
| 242 | aadup | |
| 243 | avdup | |
| 244 | a_adup | |
| 245 | a_aadup | |
| 246 | a_avdup | |
| 247 | v_avdup | |
| 248 | aa_adup | |
| 249 | aa_aadup | |
| 250 | aa_avdup | |
| 251 | av_avdup | |
| 252 | vv_avdup | |

(2) The semi-standard JVM quick instructions getfield_quick getfield_quick_w getstatic_quick ldc_quick ldc_w_quick putfield_quick putfield_quick_w putstatic_quick are construed always to operate on primitive values, using the primitive stack. The invention contemplates these additional quick instructions, which are exactly like the corresponding existing instructions without "a" beginning their name, but operate on reference values, using the reference stack:

agetfield_quick agetfield_quick_w agetstatic_quick aldc_quick aldc_w_quick aputfield_quick aputfield_quick_w aputstatic_quick Whenever a slower instruction such as getfield, getstatic, ldc, ldc_w, putfield, or putstatic is to be replaced by a quick instruction during the process of executing the slower instruction, a quick instruction whose name begins with "a" is chosen if the symbolic name resolution process determines that the datum to be transferred to or from the stack will be a reference; otherwise the usual quick instruction is chosen. The instruction agetfield_quick is identical in its function to getfield_quick, except in that agetfield_quick uses the reference stack. Similar analogies are for the other seven cited quick instruction types.

In the preferred embodiment of this invention, Java byte-code instruction set opcodes may be assigned to the new instructions as follows:

| | |
|---|---|
| 232 | getfield_reference_quick |
| 233 | getfield_reference_quick_w |
| 234 | getstatic_reference_quick |
| 235 | ldc_reference_quick |
| 236 | ldc_reference_w_ |
| 231 | putfield_reference_quick |

-continued

| | |
|---|---|
| 229 | putfield_reference_quick_w |
| 230 | putstatic_reference_quick |

Space Optimization Technique

An additional optimization technique is contemplated herein, which is not necessary for implementation of the invention but which improves space utilization. This technique is carried out by the verifier at the same time that the verifier is replacing pop, dup, and swap operations with more specialized versions while analyzing the code for a method. The objective of the optimization is to reduce the space needed on the stacks for local variables. The unoptimized technique simply reserves space for all the local variables of a method on both the primitive stack and the reference stack. This uses twice as much space for the local variables as would be necessary with the usual single-stack representation, but has the advantage that instructions that access local variables can be used unchanged.

The optimization technique is implemented with an inventive method which first analyzes, for each local variable slot, whether the slot is ever used to hold a reference value and whether it is ever used to hold a primitive value. A local variable in the JVM may be used to hold a primitive value in some parts of the code for a method and to hold a reference value in other parts of the code for the same method. The slots are then gathered into two sets that are not necessarily disjoint, i.e. a first set of all local variable slots used for primitive values and a second set of all local variable slots used for reference values. In the illustrative embodiment, let P be the number of slots in the first set and let R be the number of slots in the second set.

The slots in each set are renumbered so as to have consecutive numbers starting with zero. Specifically, for each set, for each slot S in that set, if the set contains N other slots whose original offset is less than the original offset of slot S, then slot S is renumbered to have offset N. This particular renumbering strategy advantageously allows slots that originally have consecutive offsets to be renumbered so as to have consecutive offsets in the same order. Next, once the slots are renumbered, every occurrence in the code of any of the following instructions is rewritten by the JVM verifier to refer to the new location of the stack slot, relative to the appropriate frame pointer, and according to the renumbering:

| | | | | | |
|---|---|---|---|---|---|
| iload | iload_0 | iload_1 | iload_2 | iload_3 | |
| fload | fload_0 | fload_1 | fload_2 | fload_3 | |
| lload | lload_0 | lload_1 | lload_2 | lload_3 | |
| dload | dload_0 | dload_1 | dload_2 | dload_3 | |
| aload | aload_0 | aload_1 | aload_2 | aload_3 | |
| istore | istore_0 | istore_1 | istore_2 | istore_3 | |
| fstore | fstore_0 | | fstore_1 | fstore_2 | fstore_3 |
| lstore | lstore_0 | lstore_1 | lstore_2 | lstore_3 | |
| dstore | dstore_0 | | dstore_1 | dstore_2 | dstore_3 |
| astore | astore_0 | | astore_1 | astore_2 | astore_3 | is rewritten by the verifier to refer to the new location of the stack slot, relative to the appropriate frame pointer, according to the renumbering.

Next, the results are annotated so that when the method is invoked, P slots are allocated for local variables on the primitive stack and R slots are allocated for local variables on the reference stack. The amount of excess memory used for local variables will then be equal to the size of the intersection of the two sets; if this intersection is empty, because no local variable slot is ever used for a reference value and also for a primitive value, then no excess memory will be allocated for that method.

For the reader's benefit, a specific example of the inventive space optimization method is provided. Suppose that a method uses six local variable slots. Slots 0, 3, and 4 are each used at certain points in the code of the method to hold a reference value. Slots 1 and 2 are used together at certain points in the code of the method to hold a double-precision floating-point value. Slots 1, 3, and 5 are each used at certain points in the code of the method to hold an integer value. The verifier, as it traverses the code for the method, determines the following slot information:

| 0 | 1 | 2 | 3 | 4 | 5 |
|---|---|---|---|---|---|
| reference | double - floating - point | | reference | reference | |
| | integer | | integer | | integer |

The verifier then constructs the set of local variable slots for reference values {0, 3, 4} and the set of local variable slots for primitive values {1, 2, 3, 5}. The reference value slots are renumbered:

0→0
3→1
4→2 and the primitive value slots are renumbered

1→0
2→1
3→2
5→3

Note that the consecutive slots 1 and 2, used to hold a double floating point value, are renumbered to consecutive slots 0 and 1.

Next, for example, an instruction sequence such as iload__3
istore 5
dload__1
aload 4
astore__3 would be written by the verifier, using the slot renumberings, as follows:

| iload__2 | 3 | → 2 in primitive renumbering |
| istore 3 | 5 | → 3 in primitive renumbering |
| dload__0 | 1 | → 0 in primitive renumbering |
| aload 2 | 4 | → 2 in reference renumbering |
| astore__1 | 3 | → 1 in reference renumbering |

When the method is invoked, four slots are allocated for local variables on the primitive stacks and three slots are allocated for local variables on the reference stack, for a total of seven slots. This total exceeds the six slots needed in the one-stack representation by one slot, which is the size of the intersection of the two sets. If the optimization technique were not used, six slots would be allocated on each of the two substacks for a total of 12 slots.

Note, a short one-byte instruction, such as iload__2, can always be rewritten as a short instruction, because the renumbering gives a slot a new offset that is not greater than its old offset. Also, the same offset (3, in this example) can be rewritten to different offsets depending on whether the instruction handles reference data or primitive data.

FIG. 4 is a flowchart detailing an illustrative routine which computes stack sizes and sets up the program substacks in accordance with the principles of the invention.

Although a single flowchart is shown, it should be understood that, depending on the implementation, some of the illustrated steps may be performed at different times. For example, instruction replacement as detailed in steps 402–406 may be performed at compilation or loading time, whereas stack allocation (steps 408–432) is generally performed during loading. The actual set-up of the stacks as set forth in steps 434–436 is performed by the operating system at the time of initial execution.

The routine shown in FIG. 4 begins in step 400 and proceeds to step 402, where each instruction, or bytecode, is examined. As previously mentioned, this examination can be performed during program load by the JVM verifier function. The instructions are examined to determine whether they are reference specific, primitive data specific or indiscriminate. In step 404, a decision is made based on the examination in step 402 whether the instruction is indiscriminate.

If the instruction is indiscriminate, the routine proceeds to step 406, where the indiscriminate instruction is replaced with one or more discriminate instructions as previously described. Alternatively, if, in step 404, it is determined that the instruction discriminates between reference values and primitive data, then the routine proceeds directly to step 408.

In step 408, a check is made to determine whether the instruction under examination reads or writes primitive data into a destination variable. If the instruction does read or write primitive data, then the destination variable is labeled as a primitive variable in step 410. Otherwise, the routine proceeds to step 412.

In step 412, a check is made to determine whether the instruction under examination reads or writes a reference into a destination variable. If the instruction does read or write a reference, then the destination variable is labeled as a reference variable in step 414. Otherwise, the routine proceeds to step 416.

In step 416, a check is made to determine whether any more instructions in the program stream remain. If there are remaining instructions, the routine returns to step 402 to examine the next instruction. If no instructions remain, the routine then proceeds to renumber the variables in steps 418–420 and then alter the instructions to use the renumbered variable in steps 422–432. Finally, stack slots are allocated in steps 434 and 436.

In particular, in step 418, the number of primitive variables (P) is determined from the labeled variables, and the primitive variables are renumbered as described above. Next, in step 420, the number of reference variables (R) is determined, and these are renumbered. It should be noted that it is possible for the same local variable to be labeled as a primitive variable, a reference variable or both.

Subsequently, in steps 422–432, a second pass is made over the program instructions to alter the instruction to use the renumbered variable values. In particular, the instructions are re-examined in step 422. In step 424, a check is made to determine whether the instruction under examination reads or writes primitive data into a destination variable. If the instruction does read or write primitive data, then the instruction is altered to use the renumbered value of the primitive destination variable in step 426. Otherwise, the routine proceeds to step 428.

In step 428, a check is made to determine whether the instruction under examination reads or writes a reference into a destination variable. If the instruction does read or write a reference, then, in step 430, the instruction is altered to use the renumbered reference variable number. Otherwise, the routine proceeds to step 432. If step 432 determines that additional instructions remain to be examined the routine proceeds back to step 422.

Next, in steps 434 and 436, the first and second sub-stacks are defined using the allocations made in steps 418 and 420. More particularly, in step 434, P slots are allocated for primitive local variables are pushed onto a first substack using the first substack pointer as the stack pointer and the second substack pointer as the first stack limit as previously described. Next, in step 436, R slots for the reference local variables are pushed onto a second sub-stack with and the second sub-stack limit and points set as described above. The routine then ends in step 438.

In an alternate embodiment of this work, all stack items might be capable of holding a single primitive datum, even long and double quantities. For example, all stack items would be 64 bits, and reference could be as large as 64 bits rather than 32 bits. In this case memory would be wasted when a single stack slot were used to hold a 32-bit integer or floating-point datum, or two stack slots were used to hold a long or double datum.

In yet another alternate embodiment, the invention may be implemented as a computer program product for use with a computer system. In such an implementation, all the functions performed may be implemented with corresponding processor instructions. Any number of programming languages including most processor instruction sets, assembly languages and the C programming language provide facilities which allow for the manipulation of individual bits within a data word, and would be suitable for implementation of such and all software embodiment of the invention. Such implementation may comprise a series of computer instructions either fixed on a tangible medium, such as a computer readable media, e.g. diskette, CD-ROM, ROM, or fixed disk, or transmittable to a computer system, via a modem or other interface device, such as communications adapter connected to a network over a medium. Medium can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention, such modifications to the inventive concept are intended to be covered by the appended claims.

What is claimed is:

1. In a computer system having a processor and a memory, a method for discriminating whether a datum useful in execution of program instructions by the processor is one of a plurality of operand types, the method comprising the steps of:

A. defining a first area in the memory as a first program data stack capable of accommodating a datum of a first operand type, the first program data stack having a first stack base address and a first stack limit address which define the extent of the first program data stack;

B. defining a second area in the memory as a second program data stack capable of accommodating datum of a second operand type, the second program data stack having a second stack base address and a second stack limit address which define the extent of the second program data stack;

C. storing data of the first operand type within the first program data stack, and defining a first stack pointer which identifies the current top of the first data stack, the first data stack pointer having an address value equal to the second stack limit; and D. storing data of the second operand type within the second program data stack, and defining a second program stack pointer which identifies the current top of the second data stack, the second stack pointer having an address value equal to the first stack limit.

2. The method of claim 1, wherein the first program stack base and the second program stack base define a linear, contiguous region of the memory.

3. The method of claim 1, wherein data operands of the first type are references.

4. The method of claim 1, wherein operands of the second data type are primitive values.

5. A method for discriminating between first and second operand data types in a program stack, the first and second operand data types being useful in execution of a program instruction, the method comprising the steps of:

A. identifying indiscriminate program instructions in a sequence of instructions, which indiscriminate program instructions operate with both the first and the second operand data types;

B. replacing each indiscriminate program instruction with at least one discriminate program instruction, which discriminate program instruction operates with one of the first and the second operand data types;

C. storing operand data associated with a discriminating instruction that operates with the first operand data type in a first program data stack; and D. storing operand data associated with a discriminating instruction that operates with the second operand data type in a second program data stack.

6. The method of claim 5, wherein step B comprises the step of:

B.1 mapping an indiscriminate program instruction identifier to a replacement discriminate program instruction identifier by using a look-up table.

7. The method of claim 5, wherein step B comprises the step of:

B.2 mapping an indiscriminate program instruction identifier to a replacement discriminate program instruction identifier during instruction verification.

8. A computer system comprising:

a processor;

a memory coupled to the processor;

program stack logic, operatively coupled to the processor and the memory and configured to store a first type of operand datum in a first plurality of stack entries, and to store a second type of operand datum in a second plurality of stack entries;

the first plurality of stack entries forming a first program substack defined by a first substack base address, a first substack limit address, and a first substack pointer address;

the second plurality of stack entries forming a second program substack defined by a second substack base address, a second substack limit address, and a second substack pointer address; and wherein the first substack pointer address and the second substack limit address are the same address.

9. The computer system of claim 8, wherein the second substack pointer address and the first substack limit address are the same address.

10. A computer program product for use with a computer system having a processor and a memory coupled to the processor, the computer system configured to store operand datum in a plurality of stack entries and to manipulate the stack entries during program instruction execution, the computer program product comprising a computer usable medium having program code embodied in the medium for enabling discrimination of stack entries as one of a plurality of predefined operand types, the program code comprising:

program code configured to define a first data stack to accommodate operand datum of a first predefined operand type, the first data stack having a first stack base address, first stack limit address, and a first stack pointer defining the current top of the first stack;

program code configured to define a second data stack to accommodate operand datum of a second predefined operand type, the second data stack having a second stack base address, second stack limit address, and a second stack pointer defining the current top of the second stack; and the first stack limit address being the same address as the second stack pointer address.

11. The computer program product of claim 10 wherein the second stack limit address is the same as the first stack pointer address.

12. The computer program product of claim 10 further comprising program code configured to store operand datum of the first type in the first data stack; and program code configured to store operand datum of the second operand type in the second data stack.

13. The computer program product of claim 10, further comprising:

program code, responsive to an indiscriminate program instruction which accommodates operand data of more than one predefined type, configured to convert the indiscriminate program instruction into discriminate instructions which manipulate operand data of a single type.

14. The computer program product of claim 10, wherein operand data of the first type are references.

15. The computer program product of claim 10, wherein operand data of the second type are primitive values.

16. A method for allocating memory slots for a program data stack, the program data stack useful for accommodating a plurality of operand data types during execution of a program instruction, the method comprising the steps of:

A. determining from a sequence of program instructions, a first number representing program data stack entries required to accommodate datum of a first operand data type;

B. determining from a sequence of program instructions, a second number representing program data stack entries required to accommodate datum of a second operand data type; and C. allocating a total number of slots for the program data stack equal to a sum of the first number and the second number.

17. The method of claim 16 further comprising the step of:

D. analyzing each instruction in the instruction sequence to determine the operand data types with which the instruction is compatible.

18. The method of claim 16, further comprising the step of:

E. storing datum of the first operand data type in a first plurality of contiguous slots in the program data stack.

19. The method of claim 16, further comprising the step of:

F. storing datum of the second operand data type in a second plurality of contiguous slots in the program data stack.

20. The method of claim 16, wherein step C comprises the steps of:

C.1 allocating on a first substack a number of slots equal to the first number; and C.2 allocating on a second substack a number of slots equal to the second number.

21. A method for garbage collection for use in a computer system having a processor and a memory and a program including a plurality of instructions in the memory, the method comprising the steps of:

A. identifying indiscriminate program instructions in a sequence of instructions, which indiscriminate program instructions operate with both primitive data type and reference type operands;

B. replacing each indiscriminate program instruction with at least one discriminate program instruction, which discriminate program instruction operates with one of primitive data or reference type operands;

C. storing operand data associated with a discriminating instruction that operates with the primitive data type operands in a first program data stack;

D. storing operand data associated with a discriminating instruction that operates with the reference type operands in a second program data stack; and E. using the reference type operands in the second program data stack to locate unused memory locations so that the unused memory locations can be reclaimed.

22. The method of claim 21, wherein the first program stack base and the second program stack base define a linear, contiguous region of the memory.

* * * * *